United States Patent
Fleming et al.

(10) Patent No.: US 9,652,605 B2
(45) Date of Patent: May 16, 2017

(54) PRIVATELY UNLOCKING A TOUCHSCREEN

(71) Applicant: Lenovo Enterprise Solutions (Singapore) Pte. Ltd., Singapore (SG)

(72) Inventors: Mark S. Fleming, Oro Valley, AZ (US); ZhenDe Fu, Shanghai (CN); Tao Jiang, Shanghai (CN); Jian Zhong Li, Shanghai (CN); Zhi Qiang Wei, Shanghai (CN)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 283 days.

(21) Appl. No.: 14/613,428

(22) Filed: Feb. 4, 2015

(65) Prior Publication Data
US 2015/0227306 A1 Aug. 13, 2015

(30) Foreign Application Priority Data
Feb. 11, 2014 (CN) .......................... 2014 1 0047332

(51) Int. Cl.
 G06F 3/048 (2013.01)
 G06F 21/36 (2013.01)
 G06F 3/0488 (2013.01)

(52) U.S. Cl.
 CPC ............ G06F 21/36 (2013.01); G06F 3/0488 (2013.01)

(58) Field of Classification Search
 CPC ....... G06F 21/36; G06F 3/0486; G06F 3/0488
 See application file for complete search history.

(56) References Cited

U.S. PATENT DOCUMENTS

| 8,654,091 B2 * | 2/2014 | Kim ................. H04M 1/72544 345/173 |
| 2007/0150826 A1 * | 6/2007 | Anzures ................. G06F 3/017 715/772 |
| 2011/0260829 A1 | 10/2011 | Lee |
| 2011/0265045 A1 | 10/2011 | Hsieh |

(Continued)

FOREIGN PATENT DOCUMENTS

| CN | 102768587 A | 11/2012 |
| WO | WO2010040670 A3 | 4/2010 |

OTHER PUBLICATIONS

Zhijun Zhang et al., "Unlocking Method and Device for Touch Screen", English Abstract of CN102768587A, Nov. 7, 2012, 10 pages.

*Primary Examiner* — Omar Abdul-Ali
(74) *Attorney, Agent, or Firm* — Jeffrey L. Streets

(57) ABSTRACT

A device, method and computer program product are provided for unlocking a touchscreen. In response to entering a touchscreen unlocking interface, a slide-to-unlock button is displayed on a touchscreen at its initial position, wherein the slide-to-unlock button is divided into two portions. In response to pressing a first portion of the slide-to-unlock button and sliding the slide-to-unlock button along a specified trace, information about a position of the slide-to-unlock button on the specified trace is displayed on a second portion of the slide-to-unlock button. In response to performing a first action on the pressed first portion of the slide-to-unlock button, information about a position of the slide-to-unlock button on the specified trace when the first action is performed on the first portion of the slide-to-unlock button is received.

21 Claims, 4 Drawing Sheets

(56) References Cited

U.S. PATENT DOCUMENTS

| | | | |
|---|---|---|---|
| 2012/0069231 A1* | 3/2012 | Chao | G06F 3/04883 348/333.01 |
| 2012/0174042 A1* | 7/2012 | Chang | G06F 3/0488 715/863 |
| 2012/0194447 A1* | 8/2012 | Lin | G06F 21/36 345/173 |
| 2013/0086522 A1* | 4/2013 | Shimazu | G06F 3/04817 715/810 |
| 2013/0117705 A1* | 5/2013 | Ting | H04M 1/67 715/781 |
| 2013/0167074 A1* | 6/2013 | Oonishi | G06F 3/0488 715/799 |
| 2013/0167212 A1 | 6/2013 | Azar et al. | |
| 2013/0239058 A1* | 9/2013 | Yao | G06F 3/04883 715/833 |
| 2013/0321297 A1* | 12/2013 | Li | G06F 3/041 345/173 |
| 2013/0332885 A1* | 12/2013 | Ji | G06F 3/04847 715/833 |
| 2015/0040024 A1* | 2/2015 | Higashibeppu | G06F 3/04883 715/741 |
| 2015/0153926 A1* | 6/2015 | Garcia Manchado | G06F 3/04842 715/847 |

\* cited by examiner

PRIVATELY UNLOCKING A TOUCHSCREEN

CROSS-REFERENCE TO RELATED APPLICATIONS

This application claims priority under 35 U.S.C. §119 to Chinese Patent Application No. 201410047332.5 filed Feb. 11, 2014, the entire text of which is specifically incorporated by reference herein.

BACKGROUND

Field of the Invention

The present disclosure relates to the design of touchscreen software, and more specifically, to a method and device for unlocking a touchscreen.

Background of the Related Art

Devices that include touchscreens are generally provided with a touchscreen locking function for the purpose of user privacy and preventing accidental operations during a long period of time in which users have no operations on the screens, i.e., no user operations are provided on the screens during a specified time period, to automatically enter a screen locking state, or to trigger entering into a screen locking state by users manually. Users may be provided with an unlocking user interface (UI) when their touchscreens are touched again, by which users may operate to unlock their touchscreens.

In general, a plurality of operations may be provided to allow users to unlock a user interface, such as sliding a finger along the touchscreen or entering a password. However, it is difficult to consider both convenience and safety in existing unlocking operations. For example, sliding to unlock is convenient but allows anyone to unlock the touchscreen easily. Entering a password into a password input interface during the sliding and unlocking process provides a greater level of security and privacy. However, a safety issue may arise when entering a password if the password is stolen by others peering nearby. Thereby, determining how to unlock touchscreens in a convenient and safe manner is an important technical problem.

BRIEF SUMMARY

According to one embodiment of the present disclosure, a method of unlocking a touchscreen is provided, the method comprising: in response to entering a touchscreen unlocking interface, displaying a slide-to-unlock button on a touchscreen at its initial position, the slide-to-unlock button being divided into two portions; in response to pressing a first portion of the slide-to-unlock button and sliding the slide-to-unlock button along a specified trace, displaying on a second portion of the slide-to-unlock button information about a position on the specified trace where the slide-to-unlock button is slid to; and in response to performing a first action on the pressed first portion of the slide-to-unlock button, receiving information about a position on the specified trace where the slide-to-unlock button is slid to when the first action is performed on the first portion of the slide-to-unlock button.

According to another embodiment of the present disclosure, a touchscreen unlocking device is provided, comprising: a display means configured to, in response to entering a touchscreen unlocking interface, display a slide-to-unlock button on a touchscreen at its initial position, the slide-to-unlock button being divided into two portions; a sliding means configured to, in response to pressing a first portion of the slide-to-unlock button and sliding the slide-to-unlock button along a specified trace, display on a second portion of the slide-to-unlock button information about a position on the specified trace where the slide-to-unlock button is slid to; and a receiving means configured to, in response to performing a first action on the pressed first portion of the slide-to-unlock button, receive information about a position on the specified trace where the slide-to-unlock button is slid to when the first action is performed on the first portion of the slide-to-unlock button.

According to yet another embodiment of the present disclosure, a computer program product for unlocking a touchscreen is provided. The computer program product comprises a computer readable storage medium having program instructions embodied therewith, the program instructions executable by a processor to cause the processor to perform a method comprising: in response to entering a touchscreen unlocking interface, displaying a slide-to-unlock button on a touchscreen at its initial position, wherein the slide-to-unlock button is divided into two portions; in response to pressing a first portion of the slide-to-unlock button and sliding the slide-to-unlock button along a specified trace, displaying on a second portion of the slide-to-unlock button information about a position on the specified trace where the slide-to-unlock button has been positioned by sliding; and in response to performing a first action on the pressed first portion of the slide-to-unlock button, receiving information about a position on the specified trace where the slide-to-unlock button is positioned when the first action is performed on the first portion of the slide-to-unlock button.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
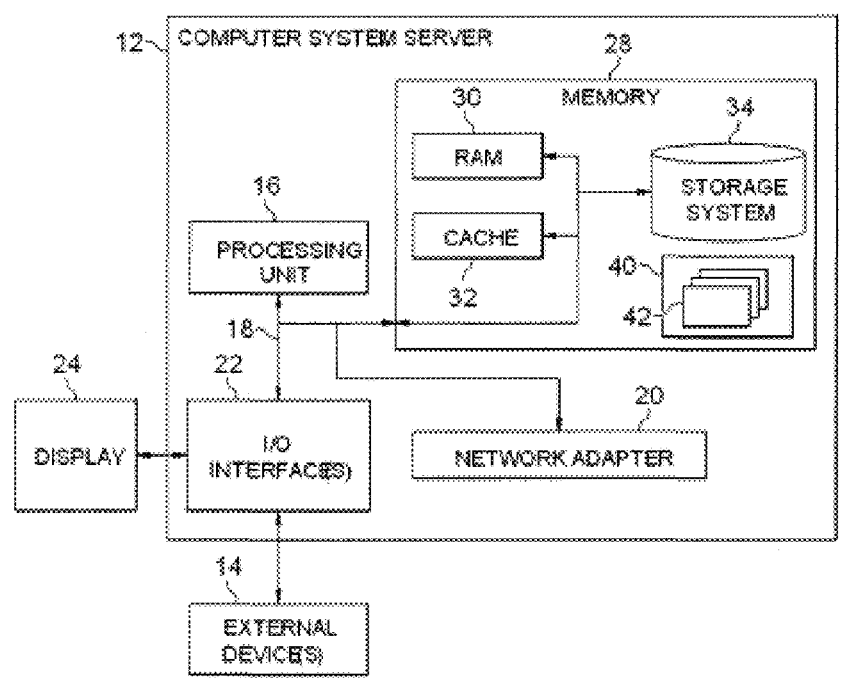
FIG. 1 is a block diagram of an exemplary computer system/server which is applicable to implement the embodiments of the present disclosure.

According to one embodiment of the present disclosure, a method of unlocking a touchscreen is provided, the method comprising: in response to entering a touchscreen unlocking interface, displaying a slide-to-unlock button on a touchscreen at its initial position, the slide-to-unlock button being divided into two portions; in response to pressing a first portion of the slide-to-unlock button and sliding the slide-to-unlock button along a specified trace, displaying on a second portion of the slide-to-unlock button information about a position on the specified trace where the slide-to-unlock button is slid to; and in response to performing a first action on the pressed first portion of the slide-to-unlock button, receiving information about a position on the specified trace where the slide-to-unlock button is slid to when the first action is performed on the first portion of the slide-to-unlock button.

According to another embodiment of the present disclosure, a touchscreen unlocking device is provided, comprising: a display means configured to, in response to entering a touchscreen unlocking interface, display a slide-to-unlock button on a touchscreen at its initial position, the slide-to-unlock button being divided into two portions; a sliding means configured to, in response to pressing a first portion of the slide-to-unlock button and sliding the slide-to-unlock button along a specified trace, display on a second portion of the slide-to-unlock button information about a position on the specified trace where the slide-to-unlock button is slid to; and a receiving means configured to, in response to performing a first action on the pressed first portion of the slide-to-unlock button, receive information about a position on the specified trace where the slide-to-unlock button is slid to when the first action is performed on the first portion of the slide-to-unlock button.

According to yet another embodiment of the present disclosure, a computer program product for unlocking a touchscreen is provided. The computer program product comprises a computer readable storage medium having program instructions embodied therewith, the program instructions executable by a processor to cause the processor to perform a method comprising: in response to entering a touchscreen unlocking interface, displaying a slide-to-unlock button on a touchscreen at its initial position, wherein the slide-to-unlock button is divided into two portions; in response to pressing a first portion of the slide-to-unlock button and sliding the slide-to-unlock button along a specified trace, displaying on a second portion of the slide-to-unlock button information about a position on the specified trace where the slide-to-unlock button has been positioned by sliding; and in response to performing a first action on the pressed first portion of the slide-to-unlock button, receiving information about a position on the specified trace where the slide-to-unlock button is positioned when the first action is performed on the first portion of the slide-to-unlock button.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are described for the purpose of providing a better understanding of the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of an exemplary computer system/server which is applicable to implement the embodiments of the present disclosure. The computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and the processing unit 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 12 typically includes a variety of computer system readable media. Such media may be any available media that is accessible by computer system/server 12, including volatile and non-volatile media, as well as removable and non-removable media.

The system memory 28 may include computer system readable media in the form of volatile memory, such as random access memory (RAM) 30 and/or cache memory 32. The computer system/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

A program/utility 40, having a set (at least one) of program modules 42, may be stored in the memory 28 by way of example, and not limitation, include an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Still yet, the computer system/server 12 can communicate with one or more networks, such as a local area network (LAN), a general wide area network (WAN), and/or a public network (e.g., the Internet), via a network adapter 20. As depicted, the network adapter 20 communicates with the other components of the computer system/server 12 via the bus 18. It should be understood that although not shown, other hardware and/or software components could be used in conjunction with the computer system/server 12. Examples, include, but are not limited to microcode, device drivers, redundant processing units, external disk drive arrays, RAID systems, tape drives, and data archival storage systems.

Figure 2:
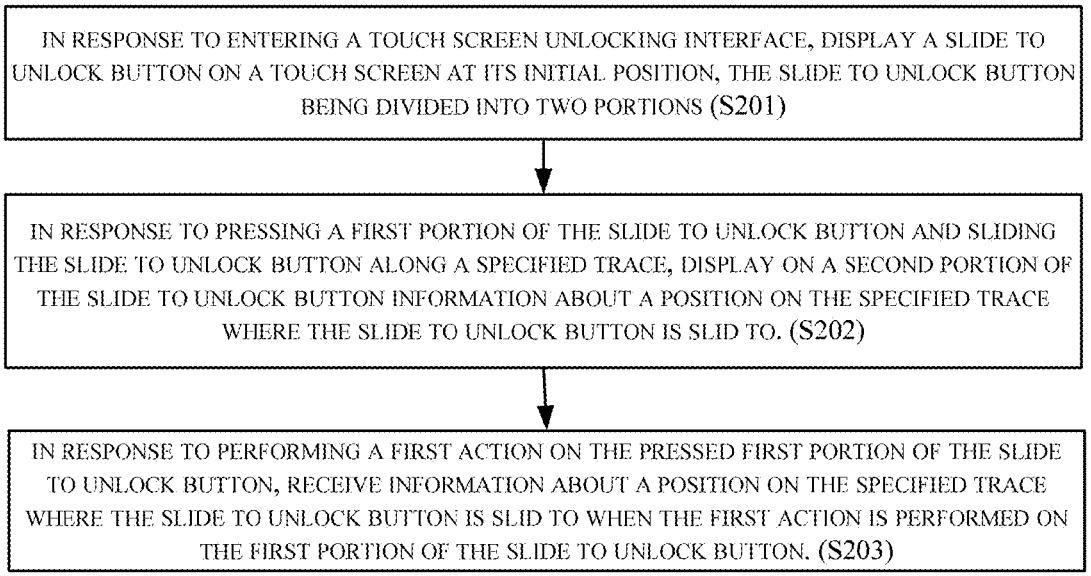
FIG. 2 is a flowchart of a method of unlocking a touchscreen.

For the safety and convenience of the touchscreen unlocking process, a method of unlocking a touchscreen is provided in an embodiment of the present disclosure, in which unlocking is also realized by sliding a slide-to-unlock button. FIG. 2 is a flowchart of a touchscreen unlocking method comprising the following steps.

At step S201, in response to entering a touchscreen unlocking interface, a slide-to-unlock button is displayed on a touchscreen at its initial position, the slide-to-unlock button being divided into two portions. As one example, a touchscreen unlocking interface may be entered or displayed by the user waking the screen display, such as by pressing a home button or other designated button on the device that includes the touchscreen. Aspects of step S201 are described in reference to FIG. 3.

Figure 3:
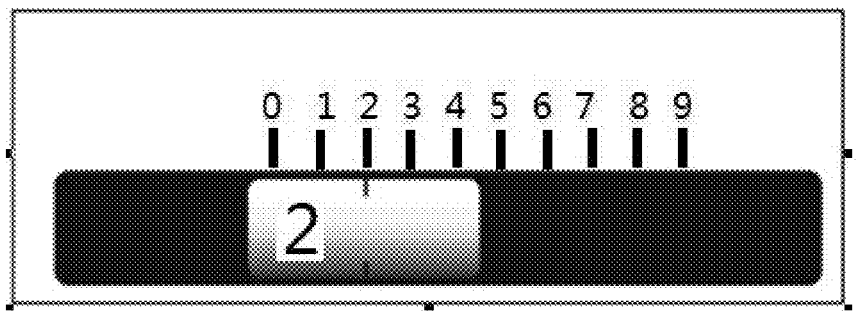
FIG. 3 is a schematic diagram of a slide-to-unlock button displayed at an initial position on a touchscreen, which is a rectangle with rounded corners and is divided into left and right portions.

FIG. 3 is a schematic diagram of a slide-to-unlock button displayed at an initial position on a touchscreen and divided into left and right portions. In this non-limiting example, the slide-to-unlock button is illustrated as a rectangle with rounded corners. Those skilled in the art may understand that the slide-to-unlock button may be a button in any shape, for example, a rectangular button with rounded or right-angle corners, or a circular or ellipse button. The initial position of the slide-to-unlock button on the touchscreen may be any position on the touchscreen, such as the top, bottom or middle of the touchscreen.

At step S202, in response to pressing or touching a first portion of the slide-to-unlock button and sliding the slide-to-unlock button along a specified trace or path, information about a position on the specified trace where the slide-to-unlock button is slid to (i.e., information associated with the button's current position on the trace) is displayed on a second portion of the slide-to-unlock button. Aspects of step S202 are described in reference to FIG. 4.

Figure 4:
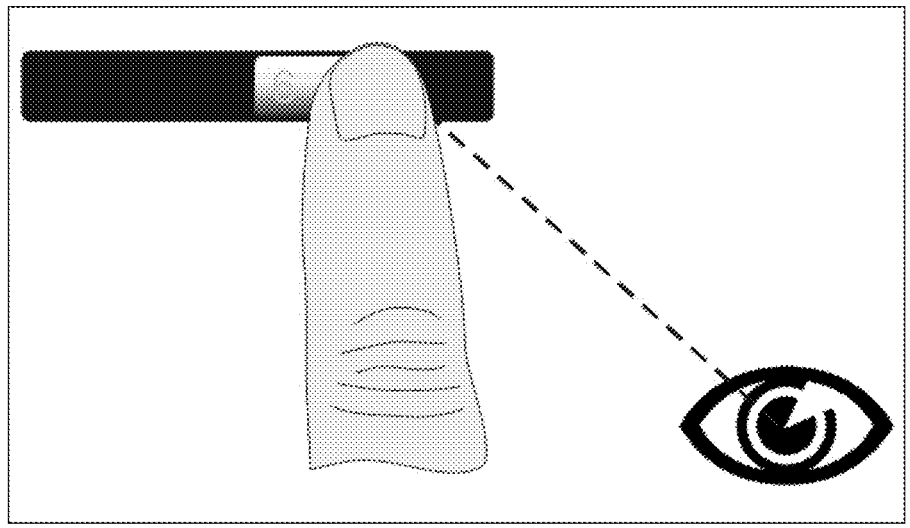
FIG. 4 is a schematic diagram of a slide-to-unlock button, which is a rectangle with rounded corners and is divided into left and right portions, with the right portion thereof being pressed.

FIG. 4 is a schematic diagram of a slide-to-unlock button, which is a rectangle with rounded corners and is divided into left and right portions, with the right portion thereof being pressed. Because the slide-to-unlock button is slid to the right on a specified trace, information about a position on the specified trace where the slide-to-unlock button is slid to is displayed on the left portion, i.e., the second portion of the slide-to-unlock button. Referring briefly to FIG. 3, during the period of pressing a first portion of the slide-to-unlock button and sliding it to the right along a specified trace, information about a position where the slide-to-unlock button stays on the specified trace is displayed nearby the specified trace. The specified trace may be provided with corresponding marks, which may be numbers such as 0-9, or alphabetic characters such as A-Z or a-z, or a combination of numbers and characters, such as numbers followed by characters or vice versa, or interleaved numbers and characters without limitation. When the slide-to-unlock button is slid to a corresponding position on the specified trace, corresponding information of the position may be highlighted. As shown in FIG. 4, when the slide-to-unlock button is slid to a position marked with "6" on the trace as shown in FIG. 3, a number "6" may be displayed on the left portion of the slide-to-unlock button. With the continuous sliding of the slide-to-unlock button, corresponding numbers "7", "8", etc. may be displayed on the left portion of the slide-to-unlock button. The slide-to-unlock button may be slid in this way if a user wants to prevent an unauthorized person on the right from seeing information displayed on the left portion of the slide-to-unlock button. In this manner, the user can easily see the numbers displayed on the button, but the user's finger will block the unauthorized person's line of sight to the numbers displayed on the button.

Figure 5:
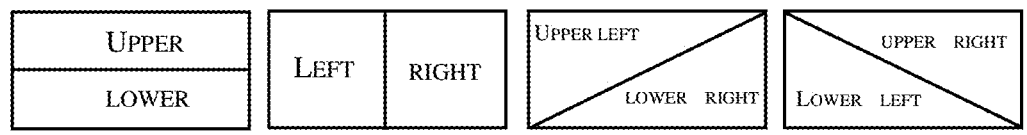
FIG. 5 is a schematic diagram of a slide-to-unlock button which is divided into two portions.

In fact, the slide-to-unlock button may be divided into two portions automatically based on the position where the slide-to-unlock button is pressed or touched. FIG. 5 is a schematic diagram of a slide-to-unlock button which is divided into two portions. It can be seen from the figure, the two portions divided may be, for example, one of: upper and lower portions, left and right portions, upper left and lower right portions, upper right and lower left portions.

If a user of the touchscreen wants to prevent an unauthorized person on the left or right of the touchscreen from peering at the entered password, the user may press or touch the slide-to-unlock button on its left or right portion, respectively, and the slide-to-unlock button may be automatically divided into left and right portions, such that the unauthorized person's line of sight to the information displayed on the right or left may be blocked by the user's finger sliding on the screen. When the sliding movement ends or pauses for a predetermined period of time, information displayed on the right or left portion corresponds to a character of the password, which allows the user to hide the entry of a password in a civil and natural manner. Correspondingly, dividing the slide-to-unlock button into upper and lower portions may prevent an unauthorized person along the upper or lower side of the touchscreen from peeping at the entered password, and dividing the slide-to-unlock button into upper left and lower right portions or upper right and lower left portions may prevent an unauthorized person nearby at various angles to the touchscreen from peeping at the entered password. Users may select which portion of the slide-to-unlock button to press or touch according to the position of unauthorized people around the touchscreen, thereby to divide the slide-to-unlock button into two portions according to the position where the button is pressed or touched.

Dividing the slide-to-unlock button into two portions automatically according to the position where the button is pressed or touched may comprise two steps. At step 1, in response to pressing the slide-to-unlock button, an area where the slide-to-unlock button is pressed is detected and the location of the area is obtained. At step 2, according to the location of the area where the slide-to-unlock button is pressed, a determination is made as to the two portions into which the slide-to-unlock button should be divided and a determination as to which portion has been pressed or touched. Herein, the pressed area of the slide-to-unlock button may be identified according to existing touchscreen techniques, which will not be described in detail. The location of the area may be the centroid of the area where the slide-to-unlock button is pressed, or the geometrical center of the area where the slide-to-unlock button is pressed, or may be defined by users themselves.

Figure 6:
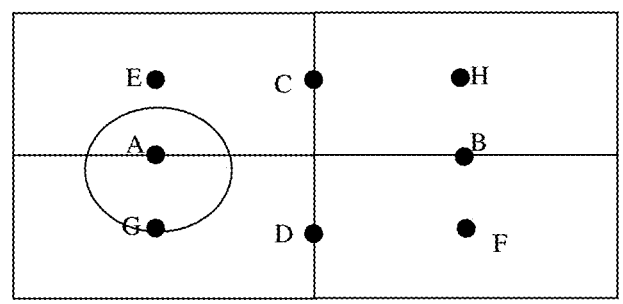
FIG. 6 is a schematic diagram of points for automatically dividing the slide-to-unlock button into two portions according to the position where the slide-to-unlock button is pressed.

For example, FIG. 6 is a schematic diagram of the slide-to-unlock button illustrating various points for automatically dividing the slide-to-unlock button into two portions according to the position where the slide-to-unlock button is pressed. The area where the slide-to-unlock button is initially pressed is shown by an ellipse. Assuming that the location of the area pressed is considered to be the geometrical center of the ellipse where the slide-to-unlock button is pressed, then the slide-to-unlock button may be divided into left and right portions if the geometrical center is closest to point A or point B, such that unauthorized persons on the left or right sides of the touchscreen are prevented from peeping at the password. Similarly, if the geometrical center is closest to point C or point D, then the slide-to-unlock button may be divided into upper and lower portions to prevent unauthorized persons along the upper and lower sides of the touchscreen from peeping at the password. Still further, the slide-to-unlock button may be divided into upper left and lower right portions if the geometrical center is closest to point E or point F, and the slide-to-unlock button may be divided into lower left and upper right portions if the geometrical center is closest to point G or point H. The first portion of the slide-to-unlock button may be determined according to the location of the geometrical center of the area where the slide-to-unlock button is pressed. For example, if the geometrical center of the area where the slide-to-unlock button is pressed is closest to point A, then the left portion of the slide-to-unlock button is the first portion and the right portion of the slide-to-unlock button is the second portion where password characters may be displayed.

In an embodiment, the specified trace on which the slide-to-unlock button is slid may be a straight line or a curve. If the specified trace is a straight line, it may be a horizontal or vertical line or a diagonal line of the touchscreen. If the specified trace is a curve, it may be an arbitrary wavy line or a folded line.

Referring back to FIG. 2, at step S203, in response to performing a first action on the pressed first portion of the slide-to-unlock button, information about a position on the specified trace where the slide-to-unlock button is slid to when the first action is performed on the first portion of the slide-to-unlock button is received.

Herein, the first action may be performed by releasing the first portion where the slide-to-unlock button is pressed (i.e., by removing the finger from the touchscreen) or retaining the first portion where the slide-to-unlock button is pressed at the position on the specified trace where the slide-to-unlock button is slid to for a period exceeding a predetermined time (i.e., by holding the finger still at a particular position on the touchscreen). Herein, the predetermined time may be specified by users.

As described above, when the slide-to-unlock button is touched on a first portion and slid on the specified trace, information about a position where the slide-to-unlock button is slid to on the specified trace is displayed on the second portion of the slide-to-unlock button. When the first action is performed on the first portion where the slide-to-unlock button is pressed, the information displayed on the second portion about the position to where the slide-to-unlock button is slid to on the specified trace is entered into a device providing with the touchscreen as a character of a password.

In an embodiment, FIG. 2 further comprises step S204 (not shown in FIG. 2) of automatically returning the slide-to-unlock button to its initial position in response to releasing the first portion where the slide-to-unlock button is pressed. The step is a preferable step. In another embodiment, in response to retaining the first portion where the slide-to-unlock button is pressed at a position where it is slid to on the specified trace for a period exceeding a predetermined time and entering a character of a password into a device providing with the touchscreen, enabling the user to further press the first portion and continuously slid the slide-to-unlock button on the specified trace or slide it towards its initial position. In either case, the method may then continue in the same manner to allow a user to enter one or more subsequent characters of a password.

In another embodiment, the first action is performed on the slide-to-unlock button several times by sliding the slide-to-unlock button along the specified trace several times. Upon releasing the first portion of the slide-to-unlock button several times, information about each of the various positions where the specified trace is slid to forms a touchscreen unlocking password.

Figure 7:
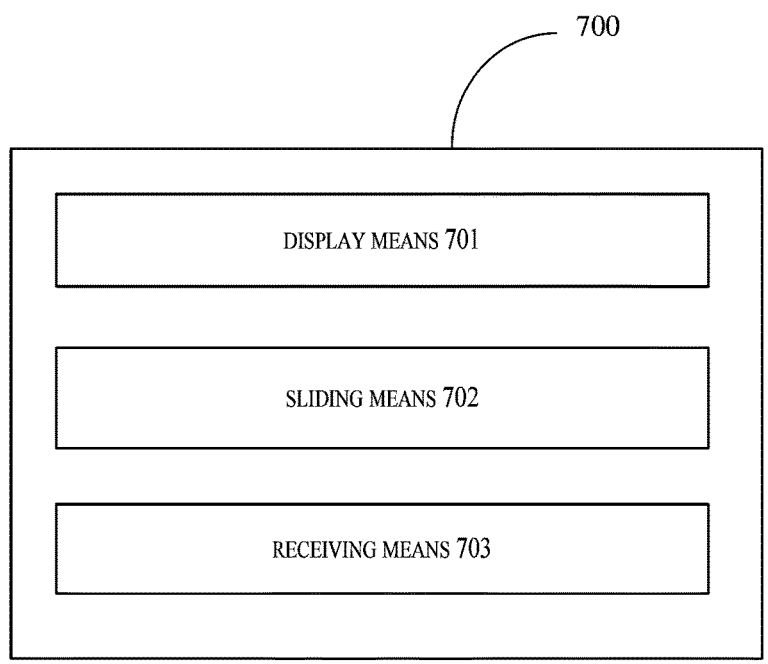
FIG. 7 is a structural block diagram of a touchscreen unlocking device according to an embodiment of the present disclosure.

FIG. 7 is a schematic diagram of a touchscreen unlocking device 700 according to an embodiment of the present disclosure. As shown in FIG. 7, the device 700 comprises: a display means 701, configured to, in response to entering a touchscreen unlocking interface, display a slide-to-unlock button on a touchscreen at its initial position, the slide-to-unlock button being divided into two portions; a sliding means 702, configured to, in response to pressing a first portion of the slide-to-unlock button and sliding the slide-to-unlock button along a specified trace, display on a second portion of the slide-to-unlock button information about a position on the specified trace where the slide-to-unlock button is slid to; and a receiving means 703, configured to, in response to performing a first action on the pressed first portion of the slide-to-unlock button, receive information about a position on the specified trace where the slide-to-unlock button is slid to when the first action is performed on the first portion of the slide-to-unlock button.

In one embodiment, performing the first action may comprise one of: releasing the first portion where the slide-to-unlock button is pressed; and, retaining the first portion where the slide-to-unlock button is pressed at a position on the specified trace where the slide-to-unlock button is slid to for a period exceeding a predetermined time.

In one embodiment, in response to performing a first action of releasing the first portion where the slide-to-unlock button is pressed, after information about a position on the specified trace where the slide-to-unlock button is slid to when the first portion of the slide-to-unlock button is released is received by the receiving means, the display means returns the slide-to-unlock button to its initial position on the touchscreen.

In one embodiment, in the sliding means, the first action is performed several times on the first portion of the slide-to-unlock button, and the slide-to-unlock button is slid along the specified trace several times, wherein a touchscreen unlocking password is formed from information about various positions on the specified trace where the slide-to-unlock button is slid to when the first action is performed on the first portion of the slide-to-unlock button several times. Wherein, information about positions on the specified trace where the slide-to-unlock button is slid to is one of: numbers, characters, or a combination thereof.

In one embodiment, the device 700 further comprises a slide-to-unlock button dividing means configured to divide the slide-to-unlock button into two portions automatically according to a position where it is pressed, wherein the two portions are, for example, one of: upper and lower portions, left and right portions, upper left and lower right portions; upper right and lower left portions. Preferably, the slide-to-unlock button dividing means comprises: an area location obtaining means configured to obtain an area where the slide-to-unlock button is pressed and a location of the area in response to pressing the slide-to-unlock button; a division determination means configured to determine the two portions that the slide-to-unlock button is divided into and the first portion that is pressed according to the location of the area where the slide-to-unlock button is pressed. Wherein, the location of the area may be one of the centroid of the area where the slide-to-unlock button is pressed, or the geometrical center of the area where the slide-to-unlock button is pressed.

In one embodiment, when the first portion of the slide-to-unlock button is pressed and slid along the specified trace, the display means displays nearby the specified trace information about a position where the slide-to-unlock button is positioned on the specified trace. In another embodiment, the specified trace may be a straight line or a curve.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

What is claimed is:

1. A method of unlocking a touchscreen, comprising:
   in response to entering a touchscreen unlocking interface, displaying a slide-to-unlock button on a touchscreen at its initial position, wherein the slide-to-unlock button is divided into two portions;
   in response to pressing a first portion of the slide-to-unlock button and sliding the slide-to-unlock button along a specified trace, displaying on a second portion of the slide-to-unlock button information about a position on the specified trace where the slide-to-unlock button has been positioned by sliding; and
   in response to performing a first action on the pressed first portion of the slide-to-unlock button, receiving information about a position on the specified trace where the slide-to-unlock button is positioned when the first action is performed on the first portion of the slide-to-unlock button.

2. The method according to claim 1, wherein performing the first action comprises one of:
   releasing the first portion where the slide-to-unlock button is pressed;
   retaining the first portion where the slide-to-unlock button is pressed at the position on the specified trace where the slide-to-unlock button is positioned for more than a predetermined time period.

3. The method according to claim 2, wherein method further comprises:
   in response to performing the first action of releasing the first portion where the slide-to-unlock button is pressed, after receiving information about a position on the specified trace where the slide-to-unlock button is positioned when the first portion of the slide-to-unlock button is released, returning the slide-to-unlock button to its initial position on the touchscreen.

4. The method according to claim 2, wherein the first portion of the slide-to-unlock button is pressed several times, and the slide-to-unlock button is slid along the specified trace several times, wherein a touchscreen unlocking password is formed from information about various positions on the specified trace where the slide-to-unlock button is positioned when the first action is performed on the first portion of the slide-to-unlock button several times.

5. The method according to claim 4, wherein information about positions on the specified trace where the slide-to-unlock button is positioned is one of: numbers, characters or a combination thereof.

6. The method according to claim 1, wherein the slide-to-unlock button is divided into two portions automatically according to a position where slide-to-unlock button is pressed, wherein the two portions are one of: upper and lower portions, left and right portions, upper left and lower right portions; upper right and lower left portions.

7. The method according to claim 6, wherein the step of dividing the slide-to-unlock button into two portions automatically according to a position where it is pressed comprises:
   in response to pressing the slide-to-unlock button, obtaining an area where the slide-to-unlock button is pressed and a location of the area on the slide-to-unlock button;
   determining the two portions that the slide-to-unlock button is divided into and the first portion that is pressed according to the location of the area where the slide-to-unlock button is pressed.

8. The method according to claim 7, wherein the location of the area is one of:
   the centroid of the area where the slide-to-unlock button is pressed; and
   the geometrical center of the area where the slide-to-unlock button is pressed.

9. The method according to claim 1, wherein the specified trace is selected from a straight line and a curve.

10. The method according to claim 1, wherein when the first portion of the slide-to-unlock button is pressed and slid along the specified trace, information about a position of the slide-to-unlock button on the specified trace is displayed nearby the specified trace.

11. A touchscreen unlocking device, comprising:
    a display means configured to, in response to entering a touchscreen unlocking interface, display a slide-to-unlock button on a touchscreen at its initial position, wherein the slide-to-unlock button is divided into two portions;
    a sliding means configured to, in response to pressing a first portion of the slide-to-unlock button and sliding the slide-to-unlock button along a specified trace, display on a second portion of the slide-to-unlock button information about a position of the slide-to-unlock button on the specified trace; and
    a receiving means configured to, in response to performing a first action on the pressed first portion of the slide-to-unlock button, receive information about a position of the slide-to-unlock button on the specified trace when the first action is performed on the first portion of the slide-to-unlock button.

12. The device according to claim 11, wherein performing the first action comprises one of:
    releasing the first portion where the slide-to-unlock button is pressed;
    retaining the first portion where the slide-to-unlock button is pressed at the position of the slide-to-unlock button on the specified trace for a period exceeding a predetermined time period.

13. The device according to claim 12, wherein, in response to performing the first action of releasing the first portion where the slide-to-unlock button is pressed, after information about a position of the slide-to-unlock button on the specified trace when the first portion of the slide-to-unlock button is released is received by the receiving means, the display means returns the slide-to-unlock button to its initial position on the touchscreen.

14. The device according to claim 12, wherein in the sliding means, the first portion of the slide-to-unlock button is pressed several times, and the slide-to-unlock button is slid along the specified trace several times, and wherein a touchscreen unlocking password is formed from information about various positions on the specified trace where the slide-to-unlock button is slid to when the first action is performed on the first portion of the slide-to-unlock button several times.

15. The device according to claim 14, wherein information about positions of the slide-to-unlock button on the specified trace is one of: numbers, characters or a combination thereof.

16. The device according to claim 11, further comprising:
a slide-to-unlock button dividing means configured to divide the slide-to-unlock button into two portions automatically according to a position where it is pressed, wherein the two portions are one of: upper and lower portions, left and right portions, upper left and lower right portions; upper right and lower left portions.

17. The device according to claim 16, wherein the slide-to-unlock button dividing means comprises:
an area location obtaining means configured to obtain an area where the slide-to-unlock button is pressed and a location of the area in response to pressing the slide-to-unlock button; and
a division determination means configured to determine the two portions that the slide-to-unlock button is divided into and the first portion that is pressed according to the location of the area where the slide-to-unlock button is pressed.

18. The device according to claim 17, wherein the location of the area is one of:
the centroid of the area where the slide-to-unlock button is pressed; or
the geometrical center of the area where the slide-to-unlock button is pressed.

19. The device according to claim 11, wherein the specified trace is one of: a straight line, or a curve.

20. The device according to claim 11, wherein when the first portion of the slide-to-unlock button is pressed and slid along the specified trace, the display means displays, nearby the first portion, the specified trace information about a position where the slide-to-unlock button is retained on the specified trace.

21. A computer program product for unlocking a touchscreen, the computer program product comprising a computer readable storage medium having program instructions embodied therewith, the program instructions executable by a processor to cause the processor to perform a method comprising:
in response to entering a touchscreen unlocking interface, displaying a slide-to-unlock button on a touchscreen at its initial position, wherein the slide-to-unlock button is divided into two portions;
in response to pressing a first portion of the slide-to-unlock button and sliding the slide-to-unlock button along a specified trace, displaying on a second portion of the slide-to-unlock button information about a position on the specified trace where the slide-to-unlock button has been positioned by sliding; and
in response to performing a first action on the pressed first portion of the slide-to-unlock button, receiving information about a position on the specified trace where the slide-to-unlock button is positioned when the first action is performed on the first portion of the slide-to-unlock button.

* * * * *